United States Patent

Holeman et al.

[15] 3,636,330
[45] Jan. 18, 1972

[54] AUTONOMOUS SPACE NAVIGATION SYSTEM UTILIZING HOLOGRAPHIC RECOGNITION

[72] Inventors: John M. Holeman; Joseph D. Welch, both of Schenectady, N.Y.

[73] Assignee: General Electric Company

[22] Filed: Mar. 14, 1967

[21] Appl. No.: 622,965

[52] U.S. Cl.................235/150.27, 340/146.3, 350/162, 356/168
[51] Int. Cl.......................................................G06f 15/50
[58] Field of Search...................235/150.27; 340/146.3; 356/168; 244/1.55; 350/35, 162; 343/100 SA, 112

[56] References Cited

UNITED STATES PATENTS

| | | | |
|---|---|---|---|
| 3,103,579 | 10/1963 | Green | 235/150.27 |
| 3,137,853 | 6/1964 | Cutler | 343/100 |
| 3,172,108 | 3/1965 | McClure | 343/112 X |
| 3,194,949 | 7/1965 | Jasperson | 235/150.27 |
| 3,292,148 | 12/1966 | Giuliano | 340/146.3 |
| 3,292,157 | 12/1966 | Mellow | 43/100 X |
| 3,435,244 | 3/1969 | Burckhardt et al. | 350/162 X |
| 3,436,216 | 4/1969 | Urbach | 96/1.1 |

OTHER PUBLICATIONS

Recording and Erasing Apparatus for Thermoplastic Holograms, Tao, IMB Technical Disclosure Bulletin, Vol. 11, No. 7, Dec. 68

Primary Examiner—T. H. Tubbesing
Attorney—Richard R. Brainard, Marvin Snyder, Paul A. Frank, Frank L. Neuhauser, Melvin M. Goldenberg and Oscar B. Waddell

[57] ABSTRACT

A navigation system in which a spacecraft "fix" or positional information is obtained by producing, from collected light, an image of a field of view from the spacecraft and thereafter comparing this image, in coherent light, with a spatial filter of a reference region. Correlation results in application of one input signal to a navigation computer. Comparison with a second input signal supplied to the computer from an inertial reference affixed to optical means for gathering the light emanating from the viewed region results in production of useful navigational data by the computer.

21 Claims, 6 Drawing Figures

Inventors:
John M. Holeman,
Joseph D. Welch,
by Marvin Snyder
Their Attorney.

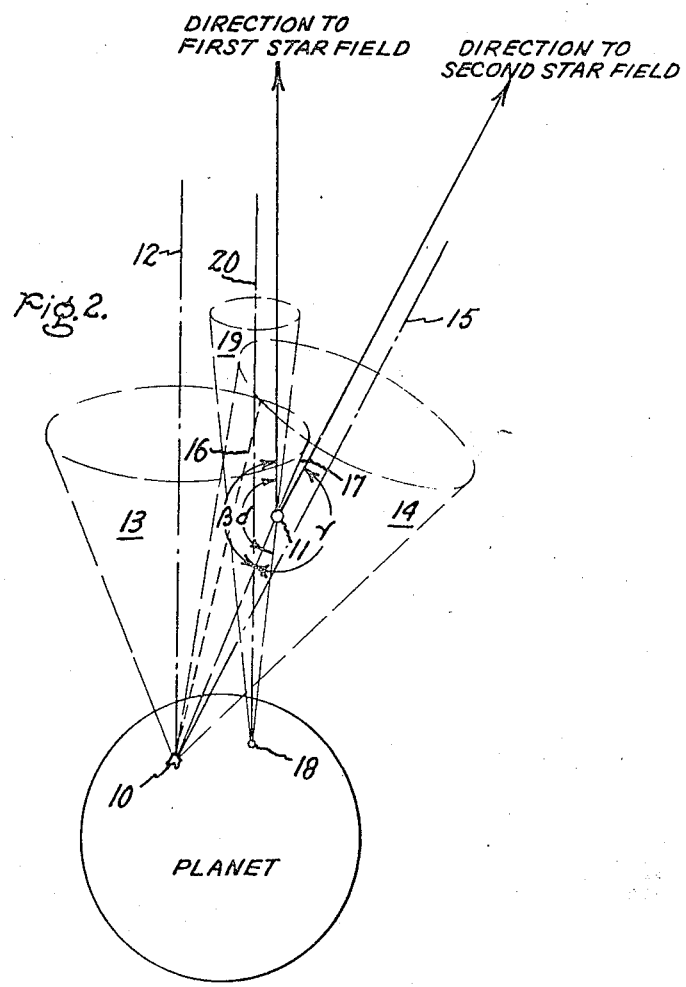

Inventors:
John M. Holeman,
Joseph D. Welch,
by Marvin Snyder
Their Attorney.

AUTONOMOUS SPACE NAVIGATION SYSTEM UTILIZING HOLOGRAPHIC RECOGNITION

BACKGROUND OF THE INVENTION

This invention relates to navigation systems, and more particularly to autonomous celestial navigation systems utilizing holographic recognition of planetary or lunar landmarks, as well as star fields, to obtain a "fix" or positional information in space.

Orbital and interplanetary space travel require navigation systems of high precision and accuracy, preferably automatic, due to the great distances over which the craft must travel. Moreover, to conserve weight and reduce energy expenditure, such systems are desirably passive. Navigation systems which heretofore have perhaps been closest to meeting these requirements have been those which utilize a vertical reference, generated by a horizon scanner, and compare this reference to a known stellar reference. However, accuracy of the prior systems has been limited due to errors introduced by the horizon scanners.

As an alternative to use of horizon scanners, tracking of planetary or lunar surface features whose locations are known has considerable advantage. Such surface features might, for example, be small lakes, islands or other features easily viewed at altitudes of several hundred miles. Positional navigational constraints can thus be determined with greater accuracy because relatively small surface features can be tracked with much higher angular accuracy than can the vertical as derived from horizon seekers. Moreover, if the spacecraft should be a relatively low altitude satellite, the position constraint uncertainty associated with landmark tracking is much smaller than that corresponding to horizon seeker vertical tracking for any given angular uncertainty introduced by the apparatus.

Automatic tracking of planetary or lunar surface features itself involves problems, however, since prior navigation systems proposed for operation on this principle involved what is known as "map-matching"; that is, obtaining coincidence or registration of a photograph or map with an optical image of the surface of the celestial body being used as a reference. This "map-matching" technique is very difficult to accomplish, since but a slight error in registration of the image with the map or photograph is sufficient to prevent detection of the surface feature being sought. Accordingly, need has arisen for a navigation system in which registration of the image being sought with a map or photograph is not critical.

The present invention fulfills the need for a navigation system in which surface features of the earth, as well as other celestial bodies within the solar system may be automatically recognized and tracked by use of an optical reference recording of known surface features, employing holography. In addition, star fields may similarly be automatically recognized and tracked by use of an optical reference recording of known star fields, by use of holography. This method of optical recognition, which may be utilized in multifarious systems, is described in detail in C. Q. Lemmond et al. application Ser. No. 492,187, filed Oct. 1, 1965 and assigned to the instant assignee. Systems of the type contemplated by the instant invention employ a spatial filter of the surface features being sought, and thereby overcome the misregistration criticality which is characteristic of nonholographic systems for detecting pattern coincidence. Examples of systems employing holography are described in the aforementioned Lemmond et al., application, as well as in J. M. Holeman application Ser. No. 560,418 and J. E. Bigelow et al., application Ser. No. 560,419, both filed June 27, 1966 and assigned to the instant assignee.

SUMMARY OF THE INVENTION

One object of the invention is to provide a passive space navigation system employing holographic recognition of earth and other solar system celestial body surface features.

Another object is to provide a precise, real-time navigation system for spacecraft in which accurate positional data is obtained by comparing spatial filters of known landmarks with images of landmarks appearing in the field of view of telescope optics on board the spacecraft.

Another object is to provide an autonomous navigation system in which navigational data is produced by holographically obtaining vector directions to known landmarks relative to a reference vector.

Another object is to provide a space navigation system in which navigational data is obtained by employing holographic recognition system to identify both predetermined celestial body surface features and predetermined star fields.

Briefly, in accordance with a preferred embodiment of the invention, a celestial navigation system for use on board a spacecraft is provided including a navigation computer for providing output data representing navigational information. Also included in the system are optical means for producing an image of a region encountered within the field of view of the spacecraft, a source of substantially coherent light, a holographic spatial filter representing a view of an existing navigational reference location, means for directing a beam of the coherent light onto the image produced by the optical means in order to impinge the light upon the spatial filter, and detecting means responsive to light energy received from the spatial filter in the form of spots at predetermined locations on the detecting means. Means are further provided for converting the spot locations into signals bearing a relationship to the spot locations and supplying the signals to the navigation computer

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 2 illustrates the navigational problem encountered by a space vehicle determining its location from known star fields and landmarks of known planetocentric or selenocentric coordinates at known times;

DESCRIPTION OF THE PREFERRED EMBODIMENTS

Figure 1A:
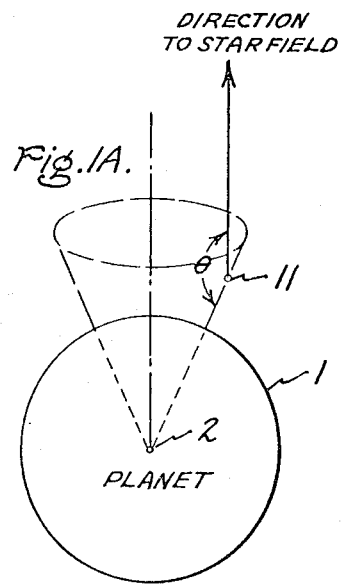
FIGS. 1A–1D are diagrammatic illustrations showing position constraints and position constraint uncertainty for navigation systems utilizing horizon seeker vertical tracking as opposed to landmark tracking.
Figure 1B:
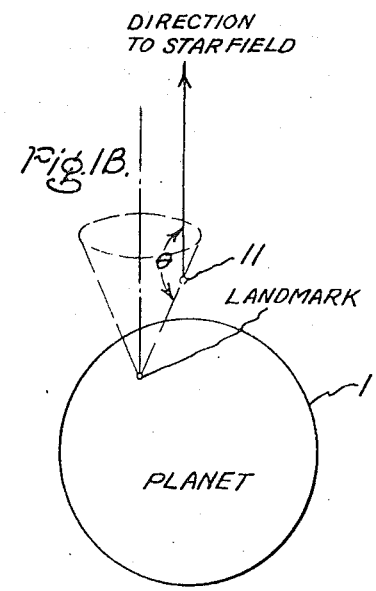

FIGS. 1A and 1B illustrate respectively the nature of the positional constraint when tracking the vertical, as with a horizon tracker which describes the surface of a cone having a vertex at the center 2 of any planet or other celestial body 1 within the solar system, and tracking a landmark on such body so as to describe the surface of a cone having a vertex at the landmark. In both FIGS. 1A and 1B it is assumed that the tracking angle data is measured from a spacecraft 11 relative to a single star field having a known stellar position and assumed to be infinitely far away. In both cases, this single measurement provides a single degree of positional constraint described by the surface of a cone having an axis lying along the direction to the star field; that is, spacecraft 11 is known to be somewhere on the surface of such cone. It is evident from the geometry of FIGS. 1A and 1B that a tracking angle Θ, relative to the star field, can be obtained respectively by tracking the vertical or the landmark only if spacecraft 11 is located on a corresponding conical locus.

Figure 1C:
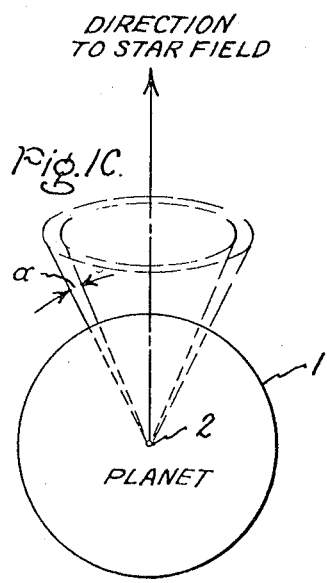
Figure 1D:
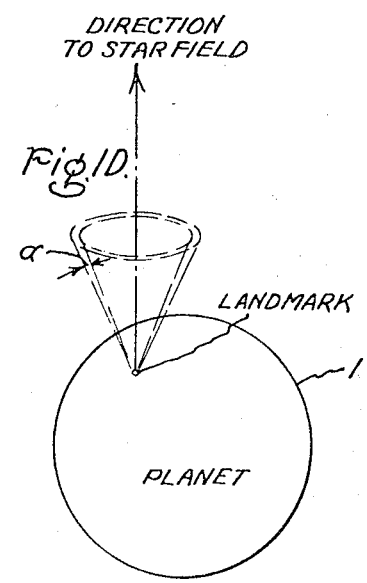

FIGS 1A and 1B show the tracking situation if it be assumed that perfect measurements have been made. However, some positional uncertainty remains, due to uncertainty which is inherein in the measurements themselves. This uncertainty is illustrated in FIGS. 1C and 1D which correspond respectively to the tracking situations of FIGS. 1A and 1B wherein, because of this uncertainty in the angular measurements, the conical loci of FIGS 1A and 1B are seen to be cones of finite surface thickness; that is, conical shells bounded by two concentric conical surfaces which correspond to the maximum and minimum in the uncertainty range of the angular measurements. The spacecraft thus may be situated anywhere within the shell in either FIGS. 1C or 1D. The uncertainty angle $\alpha$ is illustrated in FIGS 1C and 1D as the angle between generatrices of the two cones measured within a plane having one end defined by the common axis of the cones, which corresponds to half of the difference between vertex angles of the concentric cones.

The advantage of landmark tracking over the horizon tracker approach to space navigation is that the positional uncertainty due to measurement uncertainty can be significantly less in landmark tracking than vertical tracking. This is because well-defined landmarks can be tracked with less angular uncertainty than can the vertical as obtained by a horizon tracker. Moreover, the geometric base reference distance, or distance from spacecraft 11 to planet center 2 in the case of vertical tracking and distance from spacecraft 11 to the landmark in the case of landmark tracking, is much less in the case of landmark tracking than in the case of vertical tracking. This would result in a lower positional uncertainty even if the angular measurement uncertainty were no better with landmark tracking than with vertical tracking.

FIG. 2 illustrates the geometry of position determination in space when the optical apparatus of the navigation system includes landmark seeking apparatus. Although there exists a finite positional uncertainty when this determination is made, as previously described in conjunction with FIG. 1B, the positional uncertainty is herein omitted for simplicity. Hence, it is assumed that the apparatus used in planetary or lunar landmark determination is perfect, with the caveat that because positional uncertainty does exist, it appears in the information produced by the navigation computer and hence must be taken into consideration when the information is utilized.

The navigation system obtains navigational data by determining the angle $\rho$ between a landmark 10 of known planetocentric or selenocentric coordinates and a first known star field or individual known star which, in relation to the distance between the spacecraft 11 and landmark 10, is assumed to be at an infinite distance from the spacecraft. This determination places spacecraft 11 somewhere on the conical surface of a first cone 13 with an axis 12 extending between landmark 10 and the first star field, as shown in FIG. 2.

A second angle $\gamma$ is also measured between landmark 10 and a second star field or individual star which is also assumed to be at an infinite distance from the spacecraft. This determination places spacecraft 11 somewhere on the conical surface of a second cone 14 with an axis 15 extending between landmark 10 and the second star field. Cones 13 and 14 intersect along two lines 16 and 17, thereby placing spacecraft 11 somewhere along either one of these two lines. Although angles $\beta$ and $\gamma$ are described as being determined in relation to either stars or star fields, in some instances it is more convenient to locate star fields than stars as references since the unique arrangement of stars in any particular star field can provide more positive identification.

A third angle $\delta$ is measured between a second landmark 18 of known planetocentric or selenocentric coordinates and another star or star field which may conveniently be the first star or star field. This determination places spacecraft 11 somewhere on the conical surface of a third cone 19 with an axis 20 extending between landmark 18 and the first star or star field. The conical surface of cone 19 intersects the conical surfaces of cones 13 and 14 and cone 19 intersects line 17 but not line 16. In this fashion, the precise point in space of spacecraft 11 is determined.

Although the aforementioned measurements yield a precise point in space if they are all performed simultaneously, apparatus limitations may require that measurements for locating cone 19 be made after first making measurements necessary to locate cones 13 and 14. Under these conditions, the point of intersection which locates the position of the spacecraft in space would, of itself, be inaccurate. However, because the composite force field acting on the space vehicle is known, behavior of the spacecraft within the force field is determinable. Hence, the navigation computer corrects for effective movement of cones 13 and 14 with respect to cone 19, so that the position of the spacecraft can be accurately determined; that is, the force field model is programmed into the computer, taking account of parameters such as gravity, solar pressure and drag, so that behavior of the spacecraft is entirely predictable. Methods of compensating navigational data for the effect of a force field on a spacecraft are well known in the art.

Figure 3:
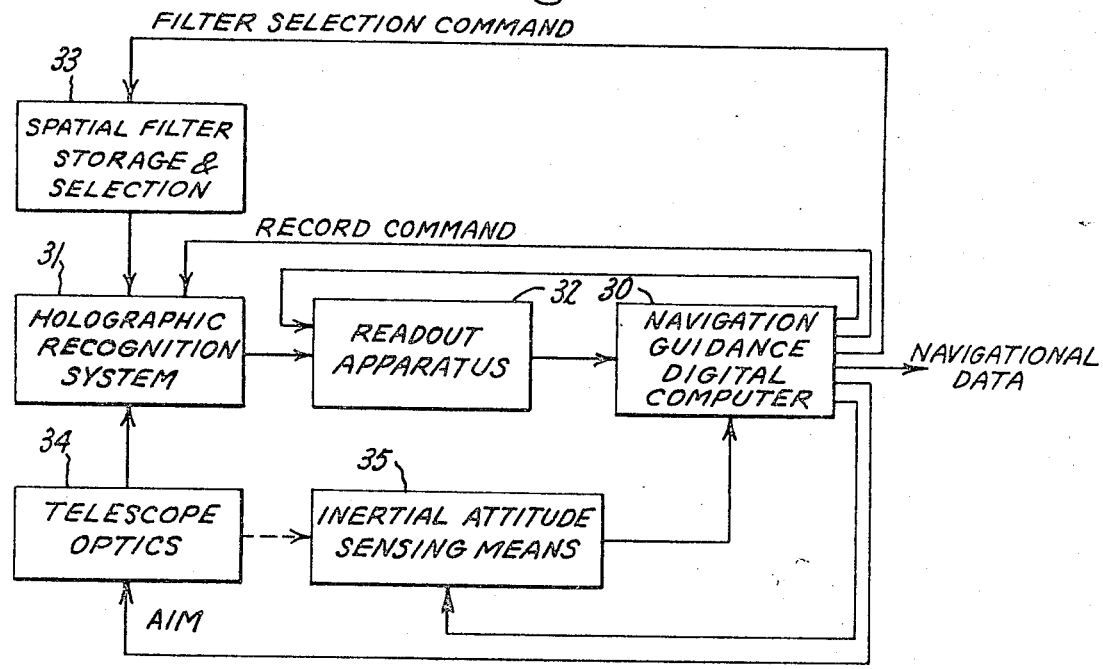
FIG. 3 is a block diagram of the navigation system of the instant invention.

FIG. 3 is a block diagram of a navigation system embodying the instant invention. The system typically includes a digital computer 30 which provides navigational data for use in either monitoring the position of the spacecraft or actually supplying guidance information to means for controlling the position in space of the spacecraft. Typically, the computer comprises a vehicle-borne digital data processor with memory, capable of performing navigational and guidance computations. Such computers, as are described in Chapter 6 of *Space Navigation Guidance and Control*, (Agardograph 105), edited by J. E. Miller and published by Technivision Ltd., Maidenhead, England (1966), are well known in the art. A holographic recognition system 31, operating on principles similar to those described in the aforementioned Lemmond et al., application, generates recognition signals which are furnished to computer 30 from readout apparatus 32. Spatial filters for use in the holographic recognition system are supplied form a spatial filter storage and selection means 33 in response to a filter selection command from the computer. Optical input signals to the holographic recognition system are supplied from telescope optics 34. Inertial attitude sensing means 35, such as a pair of two-degree-of-freedom gyros preferably affixed to the telescope optics, provides an intermediate reference to computer 30 which is used in determining the angle, at the space vehicle, between the direction to the landmark and the direction to a known star field or star. The inertial sensing means is periodically updated by recognition and tracking of known stars or star fields. Image recording by holographic recognition system 31 may be initiated by a command supplied thereto from computer 30, while readout of the holographic recognition system may be initiated upon a command supplied to readout apparatus 32 from the computer. Orientation of telescope optics 34 is controlled by an aiming signal supplied thereto by the computer.

Prior to operation of the navigation system of FIG. 3, computer 30 is programmed with force field data for the regions to be traversed by the spacecraft. In addition, the computer is supplied with initial approximate spacecraft state data based on prior measurements, launch data, or both, which are to be updated as the vehicle moves through space. Data for sequencing operations on board the spacecraft are also supplied to the computer. The spatial filter storage means is furnished with spatial filters corresponding to the areas containing the landmarks and star fields sought to be located. The initial data supplied to the computer permits orderly recognition filter selection.

With computer 30 provided with initial approximate vehicular ephemeris data, data for navigational computations subsequent to launch are supplied from telescope optics 34. The function of recognition system 31 therefore is to identify the landmark or star field corresponding to the spatial filter in the holographic recognition system and to provide a recognition signal indicating location of the landmark or star field in the optical field of view of readout means 32, which may conveniently comprise a television type of electro-optical camera utilizing vidicon tube.

In order to obtain useful tracking information, it is necessary to determine orientation of the telescope optical axis at the time an image of the field of view is recorded. The direction of the telescope optical axis thus may be derived from either stellar references, or the orientation of inertial sensing means 35 relative to the telescope optical axis which may be obtained by precision gimbal pickoffs or other types of gyro readout devices, for example, when the inertial sensing means comprises gyros. Because determination of the vector direction of a landmark relative to a stellar reference involves recognition not only of landmarks but also stellar fields, spatial filter methods may conveniently be employed for recognition in both instances. Since use of the same equipment in both instances of recognition is desirable, at least a short period reference is necessary for determining orientation of the recognition and tracking system while it is performing, in sequence, the functions of landmark and star field recognition. This orientation determination can be most effectively implemented by means of an intermediate short-period inertial reference. Because inertial sensing means 35 is thus used only as a short-period reference, gyros employed therein need not be of the high performance type in terms of drift characteristics. The optical recognition system itself can be used to monitor and update the inertial sensing means, so that the inertial sensing means itself serves as a real-time attitude reference. Thus, by updating the inertial reference, continuity of attitude reference signals between the intermittent operations of the spatial recognition and tracking system may be maintained.

Summarizing operation of the navigation system of FIG. 3, computer 30 selects spatial filters from spatial filter storage and selection means 33 for use in holographic recognition system 31. A transparency image of the field of view observed by telescope optics 34 is then recorded in response to a record command from computer 30. Readout means 32 next supplies information regarding coincidence of the selected spatial filter and the recorded field of view, assuming such coincidence has been obtained, to computer 30. Further, at the time the record command is supplied to the holographic recognition system, computer 30 admits a position signal from inertial sensing means 35 which tracks the telescopic axis of telescope optics 34. Assuming correspondence with a spatial filter including a landmark has been obtained, so that the landmark has been identified, a new spatial filter corresponding, for example, to a star field is supplied to holographic recognition system 31 from spatial filter storage and selection means 33 in response to a command from computer 30. Telescope optics 34 are then turned towards the star field to be detected, in response to a signal from computer 30, and the same process again takes place. After the star field has been detected, another landmark is searched for, etc. In the event no coincidence is detected, the telescope optics remain aimed in the same general direction and a new spatial filter for a landmark or star field, as the case may be, is selected by computer 30, another image is recorded, and coincidence is again sought. Once a spot of light representing recognition of a predetermined landmark or star field in the field of view of the telescope optics has been produced, readout apparatus 32 determines the position of the spot of light on an output plane. Because the position of this spot of light can be precisely determined, data regarding this position can precisely locate the landmark corresponding thereto, which appears in the field of view of the telescope optics. Thus, a telescope of any given field of view, such as 3°, at any given altitude, would cover a predetermined area. The position of a known landmark within that area can be precisely determined according to the position of the spot of light on the output plane as detected by readout apparatus 32 and measured, for example, by Cartesian coordinates. This is because the entire area of the output plane itself would correspond to the entire area appearing in the field of view of the telescope. Hence, the position of the detected landmark can be determined to a degree of accuracy typically better than 10 seconds of arc with a 3° field of view telescope.

The navigation system supplies yaw information to the spacecraft, obtained as a result of rotational misalignment of images. For example, after an image of planetary terrain has been recorded, the spatial filter must be in rotational alignment with the recorded image in order to achieve coincidence and produce a recognition spot of light. The degree of rotation of the spatial filter or recorded image of a landmark (which for yaw determination is preferably located near the nadir) which must be accomplished in order to achieve coincidence, is thus used as an indication of spacecraft yaw, and this data is supplied to the computer which then produces spacecraft yaw output signals as an additional parameter for navigation. The navigational data produced by computer 30 may be utilized to control spacecraft guidance apparatus, or may simply be radioed back to a monitoring station from which the spacecraft guidance apparatus may be remotely operated if desired.

Figure 4:
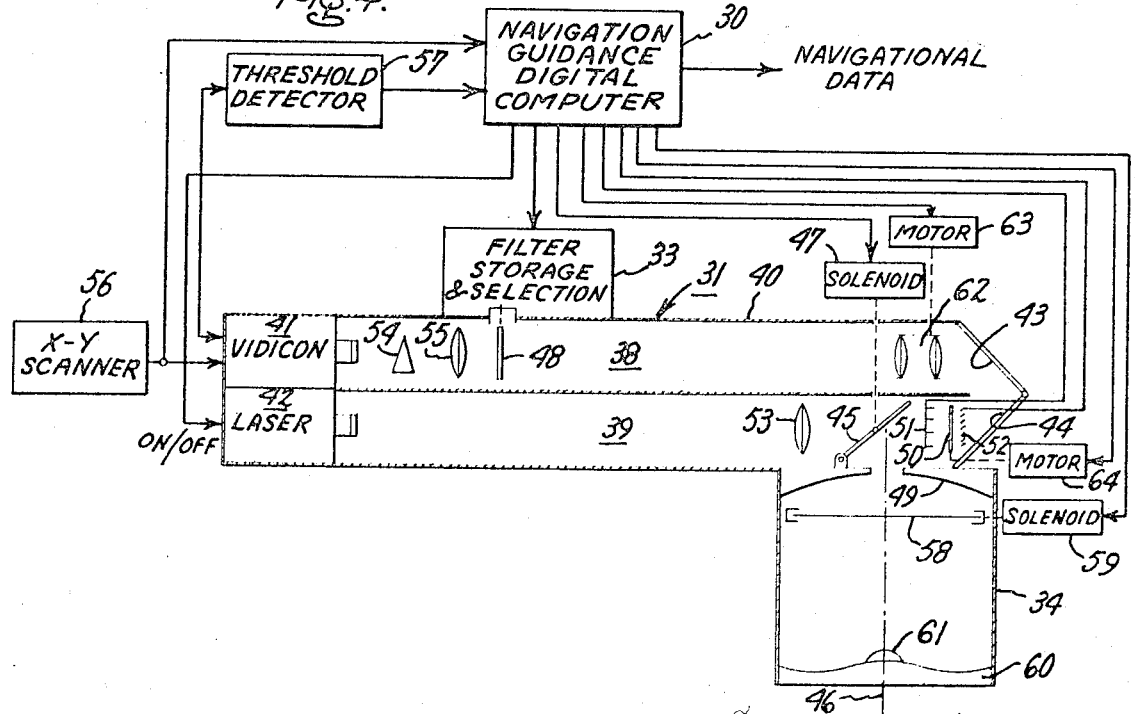
FIG. 4 is a more detailed schematic illustration of the optical portion of the navigation system of FIG. 3.

FIG. 4 is a schematic sectional view of holographic recognition system 31 of FIG. 3, along with peripheral apparatus. At one end of a chamber 40 longitudinally divided into passageways 38 and 39 is a vidicon 41 in passageway 38 and a laser 42 in passageway 39. Vidicon 41 comprises readout apparatus 32 of FIG. 3, while laser 42 is preferably a gas laser in order to comprise a coherent point source of high intensity illumination. At the opposite ends of passageways 38 and 39 are situated a pair of mirrors 43 and 44 respectively, for the purpose of "folding" or shortening the optical path in order to make the apparatus compact. These mirrors are each placed at a 45° angle with the section of chamber 40 separating the chamber into two light-isolated tubes 38 and 39. This enables light traveling down the length of passageway 39 to be reflected from mirror 44 to mirror 43 and returned through passageway 38 to the input of vidicon 41.

Situated between mirror 44 and laser 42 is a hinged mirror 45 capable of closing off an opening into passageway 39 through which light from telescope optics 34 may be admitted. Mirror 45 may be positioned parallel to mirror 44 for reflecting light onto mirror 44 when the system is in the image recording mode, or perpendicular to axis 46 of telescope optics 34 when the system is in a readout mode. Mirror 45 may be positioned by a solenoid 47 in response to a signal from computer 30.

Filter storage and selection means 33 comprises a bank of holographic spatial filters, each spatial filter such as spatial filter 48 having been made in the manner described in the aforementioned Lemmond et al., application Ser. No. 492,187 from a photographic transparency or map of the land area or star field to be viewed. That is these spatial filters are produced by interference of a sample beam, or beam having been passed through the map or photographic transparency, with a reference beam, in order to form diffraction patterns on the recording medium to comprise the spatial filter. It is possible, moreover, to produce multiple spatial filters, or holograms made from a landmark and a star field, in order to minimize the amount of spatial filter changing during a space flight.

The spatial filters themselves may comprise photographic transparencies contained in a bank and individually selected in a manner similar to that used for selection of slides to be projected in automatic slide projectors. If preferred, however, the spatial filters may be made on a film strip so as to permit the computer to select a frame on the strip for use as the recognition system spatial filter. Alternatively, the spatial filters may be mounted in a wheel which is detented so as to allow the computer to immediately select any one of the filters on the wheel for presentation in the recognition system. Whatever spatial filter 48 is selected, however, it is situated between vidicon 41 and mirror 43.

Telescope 34 is, typically, a modification of the well-known Cassegrain type, utilizing a Schmidt corrector plate 60 to correct for optical defects in the system. A convex hyperboloidal secondary mirror 61 is affixed to Schmidt plate 60, preferably by glueing. A concave spherical mirror 49 with an aperture in the center for admitting light into passageway 39 completes the essential elements of the telescope optics which thereby allow a long focal length and high magnification without attendant large telescope tube length. A shutter 58 operated by a solenoid 59 in response to a signal from computer 30 controllably permits passage of light through the aperture in mirror 49 to passageway 39.

Recording of the field of view of the telescope is accomplished on optical recording means 50, which preferably may comprise a deformable photoconductive medium such as described in J. Gaynor Pat. No. 3,291,601, issued Dec. 13, 1966 and assigned to the instant assignee. The photoconductive medium receives an electrostatic charge from charging electrodes 51, and may be heated by resistance heating means 52. The electrostatic charge and heat from heating means 52 are applied at times controlled by computer 30. Recording medium 50 is preferably capable of being rotated by a motor 64 in response to signals from computer 30. Alternatively, spatial filter 48 may be made rotatable thereby.

Additional optical elements used within chamber 40 include a collimating lens 53 in passageway 39 which receives coherent light produced by laser 42 and provides parallel rays for passage through recording medium 50 when hinged mirror 45 is in its closed position, or the position which abuts mirror 49 so as to block passage of light through the aperture of mirror 49. A focusing lens 62 is situated in the optical path between recording medium 50 and spatial filter 48, conveniently in passageway 38, for focusing light emanating from the recording medium onto the spatial filter. Lens 62 is preferably of the variable focal length type, commonly known as a "zoom" lens, in order to compensate for scale differences due to lack of correspondence between spacecraft range to the landmark and range to the landmark as represented by the photograph or map of the land region to be viewed. Thus, in the recognition mode, a motor 63, controlled by the computer, varies the focal length of lens 62 until either coincidence is detected or the entire range of the focal length has been passed through. Furthermore, by measuring the focal length setting at the instant of coincidence, and with the scale of the photograph or map of the land region being known, the computer can, if desired, provide an indication of slant range from the spacecraft to the known landmark, which is a useful navigation constraint.

A wedge-shaped prism 54 may be inserted in front of vidicon 41 so as to permit two modes of vidicon operation; recognition and normal scene observation. Thus, with the prism in place, the vidicon receives the first diffraction order image, which comprises the recognition spot, through a focusing lens 55 situated between prism 54 and spatial filter 48. Without the prism, and with spatial filter 48 removed from passageway 38, vidicon 41 receives the nondiffracted image stored on recording medium 50 and illuminated by the laser, which comprises the zero order image. Thus, if desired, prism 54 may be made removable by means of a solenoid (not shown) operated from the computer. In a further alternative mode, with hinged mirror 45 in its 45° position as shown, and with recording medium 50, prism 54 and spatial filter 48 all removed, vidicon 41 views the direct scene transmitted by telescope optics 34.

Further apparatus associated with the holographic recognition system and readout means of FIG. 4 includes an X-Y scanner 56 for determining locations of spots received on the input plane of vidicon 41. In addition, the scanner signals are supplied to computer 30. Output of vidicon 41 is supplied through a threshold detector 57 to computer 30, allowing the computer to respond only to output signals of vidicon 41 above a predetermined amplitude level. Laser 42 may be turned on and off by signals from computer 30, permitting conservation of energy when the holographic recognition system is not being operated in its readout mode.

The system of FIG. 4 begins its operating sequence when a spatial filter 48 is selected for presentation in holographic recognition system 31 by filter storage and selection means 33 in response to a signal from computer 30. A uniform electrostatic charge is applied to photoconductive medium 50 from electrodes 51 in response to a signal from computer 30. Shutter 58 is then opened momentarily by solenoid 59 in response to a signal from computer 30, allowing light from telescope 34 to reflect from mirror 45 which is in its 45° position as shown, onto the surface of photoconductive recording medium 50. This selectively discharges the charge on photoconductive medium 50 in accordance with the image viewed by telescope optics 34. Resistance heating means 52, in response to a signal from computer 30, then softens the photoplastic material of recording medium 50 by heating, allowing the material to deform in accordance with the charges thereon. After a predetermined interval sufficient to allow deformation of recording medium 50 to take place, resistance heating means 52 is deenergized, allowing recording medium 50 to cool. Mirror 45 is operated to its closed position in response to a signal from computer 30, and the readout apparatus, including vidicon 41, associated with the holographic recognition system, is now ready for operation.

To accomplish readout, laser 42 is switched on in response to a signal from computer 30. Coherent light is thus passed through recording medium 50 and reflected by mirrors 44 and 43 through spatial filter 48 to the input plane of vidicon 41. Assuming that a landmark in the field of view of telescope 34 corresponds to a landmark used in producing spatial filter 48, a spot of light is produced at a particular location on the input plane of vidicon 41. Because this recognition spot produces light above a predetermined intensity level, threshold detector 57 supplies a recognition signal to computer 30. Simultaneously, X-Y scanner 56 also supplies a signal to computer 30. By comparing the instant at which an output signal is received from threshold detector 57 with the waveforms produced by X-Y scanner 56, the computer determines the X-Y coordinates of the spot location on the input plane of vidicon 41. The spot location corresponds, to a high degree of precision, with the position of the landmark within the field of view of telescope 34. Knowing the orientation of the telescope optical axis to a high degree of precision, the computer determines, to a high degree of precision, the vector direction to the detected landmark. Further, the focal length adjustment of "zoom" lens 62, as determined preferably by the position of motor 64 provides, as previously mentioned, data indicative of slant range to the detected landmark.

In the event of rotational misalignment between spatial filter 48 and the image recorded on recording medium 50, recording medium 50, as shown, or if preferred, spatial filter 48, may be rotated by motor 64 until correspondence is obtained. By measuring the degree of rotation required to obtain a recognition spot, angular orientation of the spacecraft with respect to the landmark, or degree of yaw, may, as previously described, be determined.

After a recognition spot reading has been obtained, signals from computer 30 reposition hinged mirror 45 to its 45° angle and deenergize laser 42. Also in response to a signal from computer 30, recording medium 50 is heated by heating means 52 for an interval sufficient to raise the temperature thereof to a higher level than that required for recording an image, so as to completely discharge all charges remaining on the surface of the recording medium. A new electrostatic charge is thereupon uniformly applied to the surface of recording medium 50 from electrodes 51, and a new image is subsequently recorded on medium 50 after shutter 58 is again momentarily opened.

In the event no recognition spot is produced on the input plane of vidicon 41 when the apparatus of FIG. 4 is operated in the recognition mode, filter storage and selection means 33 positions a new spatial filter 48 between vidicon 41 and mirror 43 in response to a signal from computer 30. This process of searching for the applicable spatial filter continues until a recognition spot is produced. Thus, the system has capability for automatically searching for the proper spatial filter in the event the spacecraft should lose its bearings. A new image is not recorded upon recording medium 50 until a recognition spot is eventually produced on the input plane of vidicon 41. In the event no recognition spot is produced at all, even after each of the spatial filters has been positioned in the recognition system, the computer may be programmed to direct telescope 34 toward a different area, and a new image is recorded on recording medium 50 for correlation with the spatial filters stored in filter storage and selection means 33. Certain features relating to the optical system of FIG. 4 are claimed in divisional application Ser. No. 870,451, filed Dec. 8, 1969.

The redundant navigation data obtained from a continuing sequence of landmark tracking, as herein described, is processed by recursive statistical techniques in a manner well known in the art, in order to provide updated estimates of the present and future position and velocity state of the spacecraft. This approach makes the realistic assumption that the estimate of the spacecraft state can be adequately described in terms of a linearized departure from a nominal space vehicle ephemeris.

The foregoing describes a passive space navigation system employing holographic recognition of celestial body surface features. The navigation system provides precise navigational data in real-time by holographically obtaining vector directions to known landmarks relative to a reference. Accurate positional data is obtained by comparing spatial filters of known landmarks with images of landmarks appearing in the field of view of telescope optics on board the spacecraft. The holographic recognition system may be used to identify both predetermined celestial body surface features and predetermined star fields.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

We claim:

1. A celestial navigation system for use on board a spacecraft comprising:
   a navigation computer for providing navigational information;
   optical means for producing an image of a region encountered within the field of view of said spacecraft;
   a source of substantially coherent light;
   a holographic spatial filter,
      said filter representing a view of an existing navigational reference location;
   means for directing a beam of said light onto the image produced by said optical means in order to impinge said light upon said spatial filter;
   detecting means responsive to light energy received from the spatial filter in the form of spots at predetermined locations on said detecting means; and
   circuit means coupling said detecting means to said navigation computer,
      said circuit means converting the spot locations into signals which bear a relationship to said spot locations and are compatible with said navigation computer.

2. The celestial navigation system of claim 1 including inertial reference means affixed to said optical means, and means coupling said inertial reference means to said navigation computer.

3. The celestial navigation system of claim 1 including positionable means for rotating said spatial filter with respect to said image produced by said optical means, and means coupling said positionable means to said navigation computer.

4. The celestial navigation system of claim 3 including inertial reference means affixed to said optical means, and means coupling said inertial reference means to said navigation computer.

5. A celestial navigation system for use on board a spacecraft comprising:
   a navigation computer for providing navigational information;
   telescope means for selectively producing images of regions encountered within the field of view of said spacecraft;
   a deformable photoconductive recording medium;
   a source of substantially coherent light;
   a plurality of holographic spatial filters,
      each said spatial filter representing a view of an existing navigational reference location;
   means for directing a beam of said light onto the image produced by said telescope means on said deformable photoconductive recording medium in order to impinge said light upon a predetermined one of said spatial filters;
   detecting means responsive to light energy in the form of spots at predetermined locations on said detecting means, said light energy being received from said predetermined one of said spatial filters; and
   circuit means coupling said detecting means to said navigation computer,
      said circuit means converting the spot location into electrical signals which bear a relationship to said spot locations and are compatible with said navigation computer.

6. The celestial navigation system of claim 5 including inertial reference means affixed to said telescope means, and means coupling said inertial reference means to said navigation computer.

7. The celestial navigation system of claim 5 wherein said circuit means coupling said detecting means to said navigation computer comprises a threshold detector responsive to electrical signals above a predetermined amplitude.

8. The celestial navigation system of claim 6 wherein said circuit means coupling said detecting means to said navigation computer comprises a threshold detector responsive to electrical signals of amplitude above a predetermined value.

9. The celestial navigation system of claim 6 wherein said detecting means responsive to light energy in the form of spots at predetermined locations on said detecting means comprises a vidicon tube.

10 The celestial navigation system of claim 8 wherein said detecting means responsive to light energy in the form of spots at predetermined locations on said detecting means comprises a vidicon tube.

11. The celestial navigation system of claim 5 including positionable means for rotating said photoconductive recording medium with respect to said predetermined one of said spatial filters, and means coupling said positionable means to said navigation computer.

12. The celestial navigation system of claim 6 including positionable means for rotating said photoconductive recording medium with respect to said predetermined one of said spatial filters, and means coupling said positionable means to said navigation computer.

13. The celestial navigation system of claim 10 including positionable means for rotating said photoconductive recording medium with respect to said predetermined one of said spatial filters, and means coupling said positionable means to said navigation computer.

14. The celestial navigation system of claim 6 including variable focal length lens means between said predetermined one of said spatial filters and said photoconductive recording medium, electromechanical means coupled to said variable focal length lens means for controllably adjusting said focal length, and means coupling said electromechanical means to said navigation computer.

15. The celestial navigation system of claim 10 including variable focal length lens means situated between said predetermined one of said spatial filters and said photoconductive recording medium, electromechanical means coupled to said variable focal length lens means for controllably adjusting said focal length, and means coupling said electromechanical means to said navigation computer.

16. The celestial navigation system of claim 12 including variable focal length lens means situated between said predetermined one of said spatial filters and said photoconductive recording medium, electromechanical means coupled to said variable focal length lens means for controllably adjusting said focal length, and means coupling said electromechanical means to said navigation computer.

17. The celestial navigation system of claim 13 including variable focal length lens means situated between said predetermined one of said spatial filters and said photoconductive recording medium, electromechanical means coupled to said variable focal length lens means for controllably adjusting said focal length, and means coupling said electromechanical means to said navigation computer.

18. A celestial navigation system for use on board a spacecraft comprising:
  a navigation computer for providing navigational information;
  telescope means;
  photoconductive deformable recording means for alternately producing images of terrestrial and stellar regions encountered within the field of view of said spacecraft as viewed through said telescope means;
  a source of substantially coherent light;
  a plurality of holographic spatial filters,
    each said spatial filter representing a view of an existing navigational reference location;
  means for directing a beam of said light onto the image produced by said photoconductive deformable recording means in order to impinge said light upon a predetermined one of said spatial filters;
  detecting means responsive to light energy in the form of spots at predetermined locations on said detecting means, said light energy being received from said predetermined one of said spatial filters;
  inertial reference means affixed to said telescope means;
  circuit means coupling said detecting means to said navigation computer,
    said circuit means converting the spot locations into electrical signals which bear a relationship to said spot locations and are compatible with said navigation computer; and
  means coupling said inertial reference means to said navigation computer so as to supply said computer with new inertial reference signals after each of said images is produced.

19. The celestial navigational system of claim 18 wherein said circuit means coupling said detecting means to said computer comprises a threshold detector responsive to signals of amplitude above a predetermined level.

20. The celestial navigation system of claim 19 including positionable means for rotating said photoconductive deformable recording means with respect to said predetermined one of said spatial filters, and means coupling said positionable means to said navigation computer.

21. The celestial navigation system of claim 20 including variable focal length means situated between said predetermined one of said spatial filters and said photoconductive deformable recording means, electromechanical means coupled to said variable focal length lens means for controllably adjusting said focal length, and means coupling said electromechanical means to said navigation computer.

* * * * *